(12) United States Patent
Bleyen et al.

(10) Patent No.: US 9,090,735 B2
(45) Date of Patent: Jul. 28, 2015

(54) LIQUID ISOCYANATE COMPOSITION

(75) Inventors: Marleen Bleyen, Tienen (BE); Conny Nijs, Boutersem (BE); Chris Ian Lindsay, Tervuren (BE)

(73) Assignee: Huntsman International LLC, The Woodlands, TX (US)

( * ) Notice: Subject to any disclaimer, the term of this patent is extended or adjusted under 35 U.S.C. 154(b) by 506 days.

(21) Appl. No.: 13/504,980

(22) PCT Filed: Nov. 3, 2010

(86) PCT No.: PCT/EP2010/066692
§ 371 (c)(1),
(2), (4) Date: Jun. 28, 2012

(87) PCT Pub. No.: WO2011/054840
PCT Pub. Date: May 12, 2011

(65) Prior Publication Data
US 2012/0259066 A1 Oct. 11, 2012

(30) Foreign Application Priority Data

Nov. 4, 2009 (EP) .................................. 09175012

(51) Int. Cl.
*C08G 18/48* (2006.01)
*C08K 3/34* (2006.01)
*C08L 75/08* (2006.01)
*C08G 18/08* (2006.01)
*C08L 75/04* (2006.01)

(52) U.S. Cl.
CPC .......... *C08G 18/485* (2013.01); *C08G 18/0838* (2013.01); *C08G 18/4833* (2013.01); *C08G 18/4841* (2013.01); *C08K 3/346* (2013.01); *C08L 75/04* (2013.01); *C08L 75/08* (2013.01); *C08K 2201/008* (2013.01); *C08L 2201/14* (2013.01)

(58) Field of Classification Search
CPC ............. C08G 18/485; C08G 18/4833; C08G 18/0838; C08G 18/4841; C08K 3/346; C08K 9/04; C08K 2201/008; C08L 75/04; C08L 75/08; C08L 2201/14
USPC .......................... 524/455, 590; 523/323, 344
See application file for complete search history.

(56) References Cited

U.S. PATENT DOCUMENTS

| | | |
|---|---|---|
| 7,592,387 B2 | 9/2009 | Kim et al. |
| 2007/0197709 A1 | 8/2007 | Kim et al. |
| 2011/0046287 A1* | 2/2011 | Harikrishnan et al. ....... 524/445 |

FOREIGN PATENT DOCUMENTS

| WO | WO 03/059817 A | 7/2003 |
|---|---|---|
| WO | WO 2005/082993 A | 9/2005 |

OTHER PUBLICATIONS

X. Cao, L. J. Lee, T. J. Widya, C. Macosko, *Polymer* 46 (2005), p. 755-783.

* cited by examiner

*Primary Examiner* — Patrick Niland
(74) *Attorney, Agent, or Firm* — Robert A. Diaz (57) ABSTRACT

A liquid isocyanate composition is provided. The composition comprises
- at least one isocyanate component;
- at least one polyol and/or the adduct of said at least one isocyanate component and at least one polyol;
- clay nanoparticles.

The polyol is an EO-tipped polyol, the NCO/OH ratio being in the range of 1500 to 1.5.

10 Claims, 11 Drawing Sheets

LIQUID ISOCYANATE COMPOSITION figure 1: SAXS dispersion I figure 2: SAXS dispersion IIa figure 3: SAXS dispersion IIb figure 4: SAXS dispersion IIc figure 5 : SAXS dispersion IId figure 6 : SAXS dispersion IIe figure 7: SAXS dispersion III figure 8: SAXS dispersion IVa figure 9 : SAXS dispersion IVb figure 10 : SAXS dispersion IVc figure 11: SAXS dispersion IVd figure 12 : SAXS dispersion IVe figure 13 : SAXS dispersion V figure 14a: SAXS dispersion VIa figure 14b figure 15a: SAXS dispersion VIb            figure 15b figure 16a : SAXS dispersion VIc            figure 16b figure 17a : SAXS dispersion VId        figure 17b figure 18a : SAXS dispersion VIe        figure 18b figure 19a: SAXS dispersion VIf          figure 19b figure 20a : SAXS dispersion VIIa          figure 20b figure 21a: SAXS dispersion VIIb          figure 21b

LIQUID ISOCYANATE COMPOSITION

CROSS-REFERENCE TO RELATED APPLICATIONS

This application is the National Phase of International Application PCT/EP2010/066692 filed Nov. 3, 2010 which designated the U.S. and which claims priority to European App. Ser. No. 09175012.5 filed Nov. 4, 2009. The noted applications are incorporated herein by reference.

The invention relates to liquid isocyanate compositions, which comprise an isocyanate component and clay particles. The liquid isocyanate composition is a dispersion of the clay in the isocyanate component. The invention further relates to a method to provide such liquid isocyanate composition.

In prior art, clay particles to be incorporated in polyurethane products are often provided by incorporating the clay particles in the polyol, being the isocyanate reactive component, which is reacted with an isocyanate component for providing polyurethane material. An example of a polyol comprising clay nanoparticles is disclosed in WO03/059817A2.

Nanodispersion of clays in the isocyanate component, e.g. MDI, has been achieved by using clays in which the surface has been modified with organophilic functionality by a synthetic procedure. Typical organophilic groups include ammonium salts incorporating at least one long hydrocarbon chain. An improvement of this solution involves reaction of MDI isocyanate groups with hydroxyl groups directly on the clay surface or which form part of the ammonium salt.

Typically, the dispersions may be inhomogeneous and unstable, which might lead to (a) storage instability of MDI-clay nanodispersions and (b) ineffectiveness as property-enhancers in polyurethanes (particularly for barrier properties).

WO 2005/082993 describes isocyanate-nanoclay dispersions based upon reaction of isocyanate groups with silanol OH on Cloisite 15A, being an organically-modified montmorillonite clay. The WAX pattern in FIG. 5 of WO 2005/082993 indicates intercalation of the clay in MDI.

X. Cao, L. J. Lee, T. J. Widya, C Macosko describes in Polymer 46 (2005), 755-783 a dispersion of organically-modified montmorillonite clay (Cloisite 30B) in MDI. By grafting catalytic Tin-groups on the clay surface, the reaction of MDI with OH-groups on the clay is activated and therefore the intercalation of the clay platelets enhanced.

The present invention has as an object to provide an efficient and hence cost-effective method for generating liquid isocyanate compositions, being dispersions of clay nanoparticles in isocyanate, preferably MDI. The present invention has as a further object to provide time stable dispersions of clay nanoparticles in isocyanate, preferably MDI. The liquid isocyanate composition, being the dispersion, has further as an object to provide polyurethane or polyurea or polyisocyanurate materials with enhanced properties such as barrier performance, mechanical performance and/or fire performance, due to the presence of the clay nanoparticles, evenly distributed throughout the polyurethane or polyurea material. Specific examples of improved performance are (i) improved insulation and ageing performance in rigid foams and (ii) coatings with enhanced barrier and/or abrasion performance.

According to the present invention, a liquid isocyanate composition is provided which is a dispersion of nanoparticles of clay dispersed in an isocyanate. According to the invention, the dispersion is more stable as compared to known dispersions of clay in isocyanate. Though not wishing to be bound by any theory, the clay particles in the dispersion are believed to be exfoliated and intercalated to such a degree that the clay particles show a less tendency to settle in the dispersion.

According to a first aspect of the present invention, a liquid isocyanate composition is provided. The isocyanate composition comprises
  at least one isocyanate component;
  at least one polyol and/or the adduct of the at least one isocyanate component and at least one polyol;
  clay nanoparticles;
  wherein the polyol being an EO-tipped polyol, the NCO/OH ratio being in the range of 1500 to 1.5.

The ratio of moles of NCO-groups of the isocyanate component over the moles of OH-groups of the EO-tipped polyol in the isocyanate composition (also referred to as NCO/OH ratio) is between 1500 and 1.5.

In a liquid isocyanate composition according to a first aspect of the present invention there remain reactive isocyanate groups present, which groups are provided by the at least one isocyanate component.

The term 'liquid' is to be understood as the condensed state of matter in which the substance resists compression but is capable of flowing to take the shape of the vessel in which it is contained. In this document, the term liquid isocyanate composition is to be understood as a isocyanate composition being liquid at 50 deg C.

Clay nanoparticles, in the view of this invention, are to be understood as clay platelets having at least one dimension, typically the so-called thickness, in the range of less than 2 nm, typically in the range of 2 nm to 0.2 nm. The other two dimensions are typically in the range of 10 to 1000 nm.

The clay platelets must not necessarily be completely individualized to be present as nanoparticles. The provision of a minor amount of isocyanate component, polyol and/or the adduct of the isocyanate component and polyol between two platelets, causing the distance between said platelets to be more than the typical distance for that type of clay under non-intercalated conditions, is sufficient to understand platelets being present in the form of nanoparticles.

According to embodiments of the liquid isocyanate composition, the EO-tipped polyol may be an EO-tipped PO-polyol.

The polyol is typically a polyether polyol.

An EO-tipped polyol is to be understood as a polyol having a structure wherein x is an integer equal or more than 1, and wherein I is an initiator and R represents a series of epoxides, the (—CH$_2$CH$_2$O)$_n$H groups being bound to R via an ether bond.

The initiator I may be an alcohol, an amine, a polyalcohol, a polyamine or a component comprising one or more alcohol groups and one of more amine groups.

Suitable initiators may contain a plurality of active hydrogen atoms. Initiators, also referred to as starting component, may preferably be selected from the group consisting of water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators may be used.

The polyol is preferably a diol or a triol, i.e. x being preferably 2 or 3.

The EO-tipped polyol may be an EO-tipped EO/PO polyol, i.e. a polyol having a structure I—[R$_{EO/PO}$—(CH$_2$CH$_2$O)$_n$H]$_x$

R$_{EO/PO}$ being a random co-polymer of EO units and PO units and I being an initiator which adduct is eventually provided with an EO- end-cap (also referred to as EO tipped), i.e. the group —(CH$_2$CH$_2$O)$_n$H. n in each of the x —[R$_{EO/P)}$—(CH$_2$CH$_2$O)$_n$H] chains is a number varying from 1 to 100, and preferably from 1 to 50.

The EO-tipped polyol may be an EO-tipped EO-PO polyol, i.e. a polyol having a structure I—[(R$_{EO}$)(R$_{PO}$)—(CH$_2$CH$_2$O)$_n$H]$_x$ (R$_{EO}$)(R$_{PO}$) representing a block-polymer of one or more EO blocks, each comprising one of more EO units, and one or more PO blocks, each comprising one of more PO units, and I being an initiator, which adduct is eventually provided with an EO- end-cap, i.e. the group —(CH$_2$CH$_2$O)$_n$H. n in each of the x —[(R$_{EO}$)(R$_{PO}$)—(CH$_2$CH$_2$O)$_n$H] chains is a number varying from 1 to 100, and preferably from 1 to 50.

The EO-tipped polyol may be an EO-tipped PO polyol, i.e. a polyol having a structure I—[(R$_{PO}$)—(CH$_2$CH$_2$O)$_n$H]$_x$ i.e. a sequence of PO units (R$_{PO}$) provided to an initiator I, which adduct is eventually provided with an EO- end-cap (i.e. EO tipped), i.e. the group —(CH$_2$CH$_2$O)$_n$H. n in each of the x —[(R$_{PO}$)—(CH$_2$CH$_2$O)$_n$H] chains is a number varying from 1 to 100, and preferably from 1 to 50.

The EO-tipped polyol may be an EO-polyol, i.e. a polyol having a structure

I—[(CH$_2$CH$_2$O)$_m$H]$_x$ i.e. a sequence of EO units provided to an initiator I. m in each of the x —[(CH2CH2O)mH] chains is a number varying from 1 to 500, preferably from 1 to 100.

The polyol is preferably substantially free of basic catalysts, typically KOH, used during the alkoxylation of the polyol. Preferably, the content of basic catalyst in the polyol, typically potassium, is less than 50 ppm, most preferred less than 10 ppm. The term ppm here means weight parts per million.

According to embodiments of the liquid isocyanate composition, an EO-tipped PO polyol or an EO-polyol is used.

Most preferred, an EO-tipped PO polyol is used. The EO content of the EO-tipped PO polyol may range from less than 50% w, even less than 30% w, such as 15% w. The % w refers to the weight of the EO-units over the total weight of the EO-tipped PO polyol.

According to embodiments of the liquid isocyanate composition, the polyol may provide 1% w to 50% w of the liquid isocyanate composition, e.g. 5% w to 25% w of the liquid isocyanate composition, preferably 10 w % to 20 w %.

The % w refers to the weight of the polyol over the total weight of the liquid isocyanate composition which comprises said polyol.

According to embodiments of the present invention, the NCO/OH ratio, i.e. the ratio of moles of NCO-groups of the liquid isocyanate component over the moles of OH-groups of the EO-tipped polyol, in the liquid isocyanate composition is between 300 and 1.8, most preferred between 150 and 2.5.

According to embodiments of the liquid isocyanate composition, the clay may be an organically modified clay.

Clay materials suitable for use within the particular invention are those which belong to the family of smectite clays such as montmorillonite or hectorite. These clay materials are known to be swellable with compatible compounds and therefore 'd-spacing', also referred to as intergallery spacing, increases. More generally these clays are members of the family of 2:1 layered silicates. In this particular invention the preferred clays are montmorillonite clays.

The preferred layered clays are modified clays which have been modified with onium ions comprising at least one long alkyl chain (>C8) and three other substituents. Presence of reactive functionality of at least one of the substituents with the constituents of the polymeric matrix is desired to achieve the enhanced properties. The long alkyl chain is desirable to promote intercalation by interaction with the hydrophobic unit of the compound and/or any constituents of the polymeric matrix, thus enabling de-lamination of the clay.

The clay may be organically modified, e.g. treated with a quaternary ammonium salt, e.g. methyl tallow bis-2-hydroxyethyl ammonium.

The amount of clay is preferably less than 30% w, e.g. 0.0001 w % to 30 w %, based on the total weight of the liquid isocyanate composition.

The liquid isocyanate component is an organic isocyanate, preferably a polyisocyanate component.

Polyisocyanate components which may be used in the invention include aliphatic, cycloaliphatic and araliphatic polyisocyanates, for example hexamethylene diisocyanate, isophorone diisocyanate, cyclohexane-1,4-diisocyanate, dicyclo-hexylmethane-4,4-diisocyanate an p-xylylene diisocyanate.

Diisocyanates such as 1,5-naphthalene diisocyanate; p-phenylene diisocyanate, m-phenylene diisocyanate, 2,4-toluene diisocyanate, 2,6-toluene diisocyanate, 4,4'-diphenylmethane diisocyanate, 2,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like or mixtures thereof may be used as polyisocyanate components.

Preferably, the isocyanate components are MDI (methyldiphenyldiisocyanate) or TDI (toluenediisocyanate), most preferably MDI. Diphenylmethane diisocyanate (MDI) based isocyanates may be MDI isomers, that is to say 4,4'-diphenyl-methane diisocyanate, 2,4'-diphenylmethane diisocyanate and mixtures thereof and polymeric MDI having an isocyanate functionality of more than 2. Mixtures of diisocyanates, and mixtures of diisocyanates and higher functionality polyisocyanates may be used if desired.

Other MDI variants are well known in the art and include liquid products obtained by the introduction of urethane, allophanate, urea, biuret, carbodiimide, uretonimine and/or isocyanurate residues.

It was surprisingly found that the viscosity of the liquid isocyanate composition increased substantially using an EO-tipped polyol, which on its turn causes the dispersion to remain stable for a longer time. The so-called shelf life of the dispersion is extended. Though not wishing to be bound by any theory, it is believed that the presence of an EO-tipped polyol which is likely to react with the isocyanate component, promotes the exfoliation and/or the intercalation and even may lead to delamination of the platelets of the clay particles to such an extent that this viscosity increasing effect occurs.

When eventually a polyurethane or polyurea material is made using the isocyanate composition as one of the raw materials, the clay particles may become more evenly distributed throughout the polyurethane or polyurea material.

Dispersions of nanoparticles of clay in isocyanate in general, and MDI in particular typically show a viscosity that is high enough to ensure storage stability, but low enough to be processable in conventional polyurethane or polyurea processes.

The viscosity of the dispersion increased during preparation, but only increases by an amount within an acceptable range for processable isocyanates, if any, during storage, while substantially no precipitation of the clay particles is noticed.

According to a further aspect of the present invention, the dispersion of the clay nanoparticles in the liquid isocyanate may further be improved by using a method for dispersing said clay nanoparticles in said isocyanate according to the second aspect of the present invention.

A method for providing a liquid isocyanate composition according to the present invention comprises
  providing
    at least one isocyanate component,
    clay particles, and
    at least one EO-tipped polyol;
  combining said isocyanate component and said clay particles;
  mixing said combination of isocyanate component and clay particles, for a period of 1 minute to 10 hours, at high shear, while maintaining the temperature of said combination in the range of 25 deg C to 80 deg C;
  adding said EO-tipped polyol to said combination of isocyanate component and clay particles in such amount that the NCO/OH ratio being in the range of 1500 to 1.5;
  mixing said combination of isocyanate component, clay particles and EO-tipped polyol, for a period of 1 minute to 10 hours, at high shear, while maintaining the temperature of said combination in the range of 60 deg C to 100 deg C, thereby providing said liquid isocyanate composition.

The term "high shear mixing" refers to mixing or mixing processes which involves shear rates in excess of 1000 s$^{-1}$. A high shear mixing device is a device suitable to perform high shear mixing.

Suitable and preferred polyols, isocyanate components and clay particles, as well as suitable amounts for these components are identical as set out in view of the liquid isocyanate composition according to the first aspect of the present invention.

Mixing the combination of isocyanate component and clay particles in a first mixing step is preferably done while keeping the temperature of the mixture in the range of 25 deg C to 80 deg C, more preferred in the range of 30 deg C to 70 deg C, even more preferred in the range of 40 deg C to 60 deg C, such as e.g. at 50 deg C.

A high shear mixing is used during this first mixing step, e.g. mixing, e.g. mechanical mixing, at a speed in the range of 500 to 3000 rpm, e.g. 1000 rpm. Typically, a high shear mixing device being a mechanical mixer having high shear impellors (e.g. saw tooth or Cowles blades) can be used. An alternative high shear mixing device may be a rotor-stator device (e.g. Silverson), a colloid mill, a bead mill, a 3-roll mill or an ultrasound mixer or a microfluid processor.

This first mixing step may apply mixing during a period of 1 minute to 10 hours, more preferred in the range of 30 minutes to 2 hours, e.g. 1 h.

The two components, i.e. the isocyanate component and the clay particles may be combined gradually, while applying low shear mixing. Preferably the isocyanate component is already brought at a temperature in the range of 25 deg C to 80 deg C, more preferred in the range of 30 deg C to 70 deg C, even more preferred in the range of 40 deg C to 60 deg C, such as e.g. at 50 deg C, before the addition of the clay particles is started.

Mixing the combination of isocyanate component and clay particles with the polyol in a second mixing step is preferably done while keeping the temperature of the mixture in the range of 60 deg C to 100 deg C, preferably in the range of 70 deg C to 90 deg C, more preferred in the range of 75 deg C to 85 deg C, such as e.g. at 80 deg C.

A high shear mixing is used during this second mixing step, e.g. mixing, e.g. mechanical mixing, at a speed in the range of 1500 to 20000 rpm, e.g. in the range of 2500 to 10000 rpm, or even in the range of 3000 to 10000 rpm or even in the range of 3000 to 5000 rpm. Typically, a high shear mixing device being a mechanical mixer having high shear impellors (e.g. saw tooth or Cowles blades) can be used. An alternative high shear mixing device may be a rotor-stator device (e.g. Silverson), a colloid mill, a bead mill, a 3-roll mill or an ultrasound mixer or a microfluid processor.

This second mixing step may apply mixing during a period of 1 minute to 10 hours, more preferred in the range of 20 minutes to 5 hours, most preferably in the range of 2 hours to 3 hours, e.g. 2h.

The two components, i.e. the combination of isocyanate component and clay particles on the one hand, and the polyol on the other hand, may be combined gradually, preferably by means of high shear mixing. Preferably the combination of isocyanate component and clay particles is already brought at a temperature in the range of 60 deg C to 100 deg C, preferably in the range of 70 deg C to 90 deg C, more preferred in the range of 75 deg C to 85 deg C, such as e,g. at 80 deg C, before the addition of the polyol is started.

The clay particles may be dried before they are added to the isocyanate component. The water content of the clay may be brought to 1 a 1.5% w, the % w referring to the weight of the water over the total weight of the clay particles and water.

The methods according to the present invention have the advantage that the clay particles become exfoliated and/or intercalated and even delaminated to a further extent, such that the clay, in the form of clay nanoparticles, becomes distributed throughout the liquid isocyanate composition more evenly as clay nanoparticles, exfoliated and delaminated even to the level of clay platelets.

It was also noticed that, during the second mixing step, the viscosity of the liquid isocyanate composition increased substantially, which on its turn causes the dispersion to remain stable for a longer time. Though it is believed that some of the viscosity increase may be caused by self-polymerizing, e.g. trimerising, of the isocyanate groups of the isocyanate component, it is believed that the major part of the viscosity increase is caused by the dispersing of the clay particles.

The viscosity of the liquid isocyanate composition may, after being prepared, increase to some extent, however it was found that this viscosity change is well within the acceptable range of well processable liquid isocyanate compositions.

The so-called shelf life of the obtained liquid isocyanate composition, i.e. a dispersion, is extended.

The viscosity of the dispersion increases during preparation to a large extent during the second mixing step, while during the first mixing step, only a limited increase of viscosity is noticed, if any.

When eventually a polyurethane or polyurea material is made using the liquid isocyanate composition as one of the raw materials, the clay particles may become more evenly distributed throughout the polyurethane or polyurea material.

According to a further aspect of the present invention, the liquid isocyanate composition according to the first aspect of the present invention, or the liquid isocyanate composition obtained by a method according to the second aspect of the invention, is used in the production of polyurethane material or polyurea material.

The polyurethane material or polyurea material may be polyurethane or polyurea foam, thermoplastic polyurethane or polyurea material, thermoset polymers in the form of coatings, sheets, tubes, casted forms and alike. Foams may be in the form of open or closed cell foams, flexible, semi-rigid or rigid foams.

In general, the liquid isocyanate composition according to the present invention is reacted with one or more isocyanate reactive components, optionally in the presence of one or more additives such as catalysts, fire retarders, blowing agents (physical and/or chemical blowing agents), gelling agents, water, surfactants, coupling agents, flow modifiers, UV stabilisers, antioxidants, dyes, pigments, biocidal agents, antistatic agents, fillers or other additives generally used in polyurethane or polyurea production.

The liquid isocyanate reactive components may be hydroxyl-terminated polyoxyalkylene or polyester polyols, or amine terminated polyoxyalkylene or polyester polyols, or combinations of such isocyanate reactive components.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

Granule: A high length-scale (multi-micron) structure consisting of extensively aggregated and/or agglomerated groups of clay platelets.

Platelet: A sheet-like inorganic structure which is typically silicate-based, its thickness typically being in the range of less than 2 nm, typically in the range of 2 nm to 0.2 nm, e.g. 0.5 to 1 nm thick, the other two dimensions are typically in the range of 10 to 1000 nm, e.g. in the range of 20 to 1000 nm, often having a diameter of 10-1000 nm. Platelets are the primary, indivisible clay nanoparticle.

Gallery: The space between individual platelets. The sum of the gallery distance and platelet thickness constitutes the "d001" basal spacing (platelet spacing) which is measured by X-ray scattering.

Exfoliation: This refers to an expansion process in which the density of the platelet groups is decreased by increasing the distances between the platelets whilst substantially reducing or eliminating alignment of the platelets. In the process groups of platelets are de-aggregated into smaller platelet groups separated by "free-volume".

Intercalation: This refers to an expansion process in which the density of the platelet groups is decreased by increasing the distances between the platelets in a group of platelets whilst substantially retaining alignment of the platelets.

Delamination: This refers to the separation of individual platelets and results in an increase in the "d001" basal spacing or it's disappearance.

The term "viscosity" means the static viscosity at 50 deg C.

The viscosity of the dispersions is measured with a Brookfield R/S Plus Controlled Stress Rheometer using a cone-plate system at 50° C. A cone with a diameter of 50 mm and an angle of 1.018° was used. The shear stress was increased from 0 to 350 Pa in 1 min, then kept constant at 350 Pa for 1 min and subsequently decreased from 350 to 0 Pa in 1 min. The viscosity was calculated from the average shear rate at 350 Pa applying Casson regression.

Preparation and Characterisation of Nanoparticles in the Dispersions

EXAMPLE 1

Cloisite 30B Nanodispersions in Suprasec 3050

An EO-tipped polyol, being an EO end-tipped PO polyol used in the example 1 is Arcol 1374. Arcol 1374 is a glycerol initiated EU end-tipped polypropylene oxide polyol with 15% EO, a functionality of 2.4, OHv 28. The polyol was dried under reduced pressure at 105 deg C.

The isocyanate is Suprasec 3050, which is a monomeric MDI consisting of 50% 4,4'-MDI and 50% 2,4'-MDI The clay used in the example is Cloisite 30B, from Southern Clay Products. Cloisite 30B is a montmorillonite clay modified with a quaternary ammonium salt methyl tallow bis-2-hydroxyethyl ammonium. The clay was dried at room temperature, in a dry atmosphere (phosphorous pentoxide), and full vacuum, to a water content of about 1-1.5 wt %. SAKS pattern of unintercallated Cloisite 30B show a diffraction peak at 18 Å, being typical for the d-spacing of the clay platelets in this unintercallated Cloisite 30B.

Cloisite 30B (=C30B) is added gradually to Suprasec 3050 (=S3050) at 50 deg C and under low shear mixing. When all the clay has been added the dispersion is mixed at maximum shear (±1000 rpm) at 50 deg C for 1 hour. The temperature of the dispersion is then increased to 80 deg C and Arcol 1374 (=A1374) is added gradually. The dispersion is further mixed at high shear (3000-5000 rpm) and 80 deg C for 2 hours. The ratio of the components are 5 pbw Cloisite 30B/85 pbw Suprasec 3050/10 pbw Arcol 1374. The properties of this dispersion are represented in table 1 by dispersion I.

A series of dispersions were prepared without Arcol 1374 and/or at different mixing conditions:

IIa) same mixing temperatures and mixing times as in the procedure described above, but without the addition of Arcol 1374;

IIb) 6 hours mixing at 50 deg C and maximum shear without the addition of Arcol 1374;

IIc) 6 hours mixing at 80 deg C and maximum shear without the addition of Arcol 1374;

IId) prepolymerisation of Suprasec 3050 and Arcol 1374 at 80 deg C for 30 min before 5 wt % clay Cloisite 30B is added, followed by 2 hours mixing at 80 deg C and high shear.

IIe) Arcol 1374 was replaced by PPG4000 (100% PO polyol) in the dispersion procedure described above (C30B-S3050 dispersion mixed at 50 deg C for 1 hour, 10 w % PPG4000 is added, dispersion is further mixed at 80 deg C for 2 hours)

The properties of these dispersions are represented in table 1 by dispersions IIa to IIe.

The dispersions were evaluated via viscometry and Small Angle X-ray Diffraction. Table 1 gives an overview of the viscosities and SAXS results of the dispersions. The SAXS patterns of the dispersions are shown in FIGS. 1 to 6.

TABLE 1

| Dispersion | Viscosity | SAXS |
|---|---|---|
| I | 1508 cPs | Exfoliation. A minor diffraction peak around 45 Å present. (see FIG. 1) |
| IIa | 105 cPs | Intercalation Small peak at 18.5 Å and a peak around 45 Å (see FIG. 2) |
| IIb | <80 cPs | No intercalation - peak at 18.5 Å (see FIG. 3) |
| IIc | 1257 cPs | Intercalation Peak at 20 Å and 44 Å (see FIG. 4) |
| IId | 536 cPs | Intercalation Peak at 44 Å (see FIG. 5) |
| IIe | 201 cPs | Small peak at 18.5 Å and 44 Å (see FIG. 6) |

Figure 1:
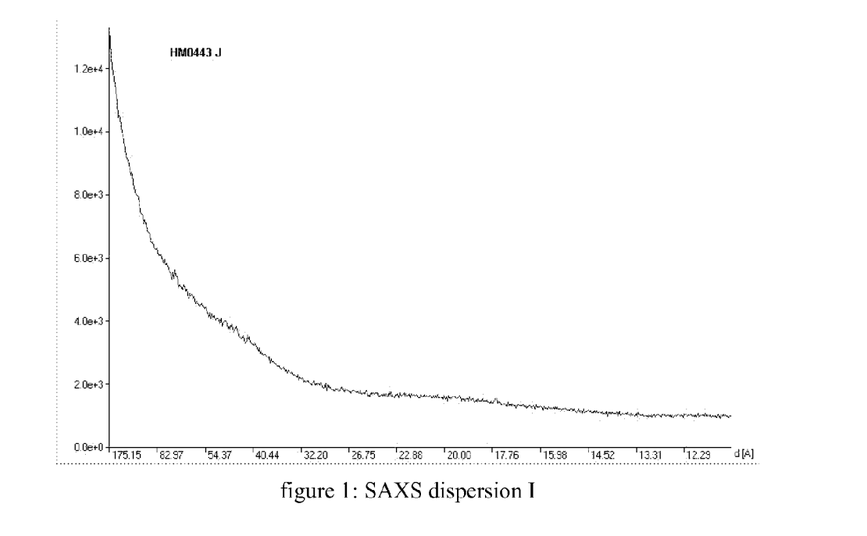
FIGS. 1, 2, 3, 4, 5, 6, 7, 8, 9, 10, 11, 12 and 13 are SAXS diagrams of dispersions.
Figure 2:
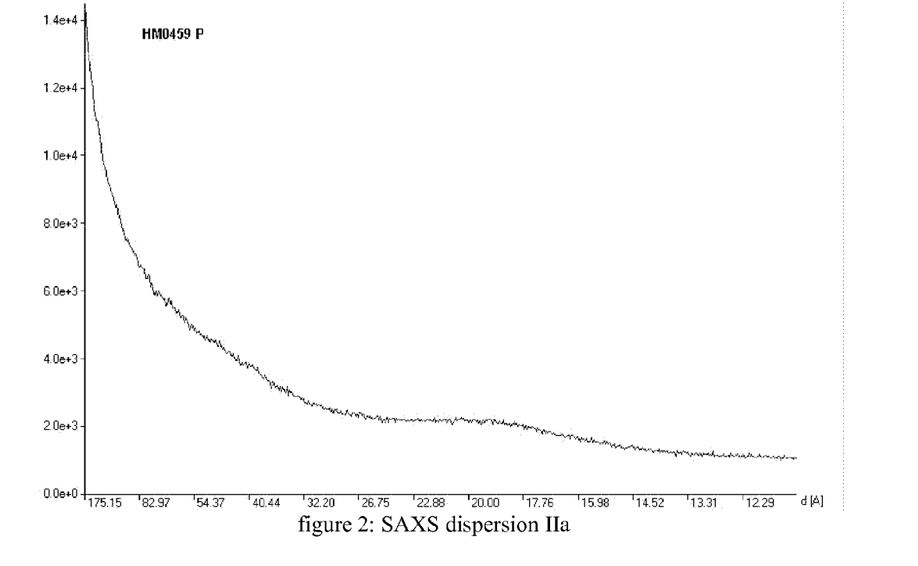
Figure 3:
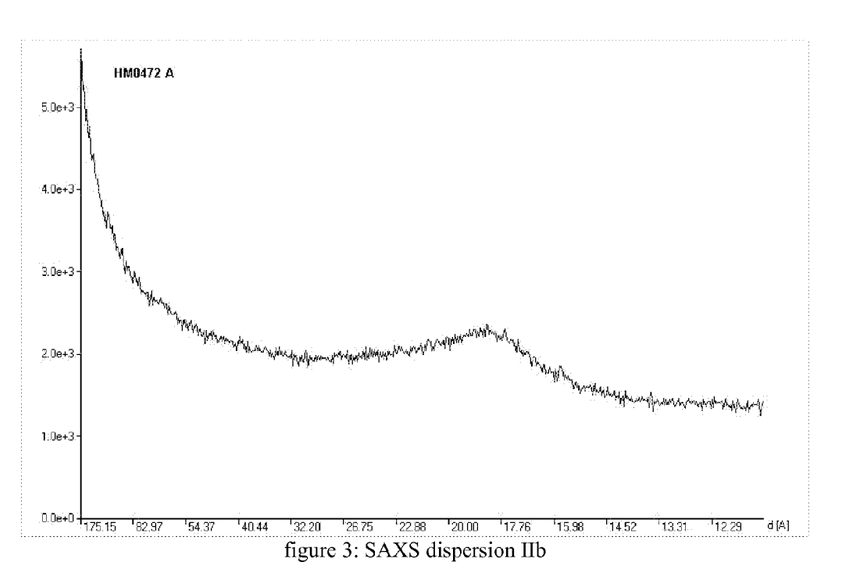
Figure 4:
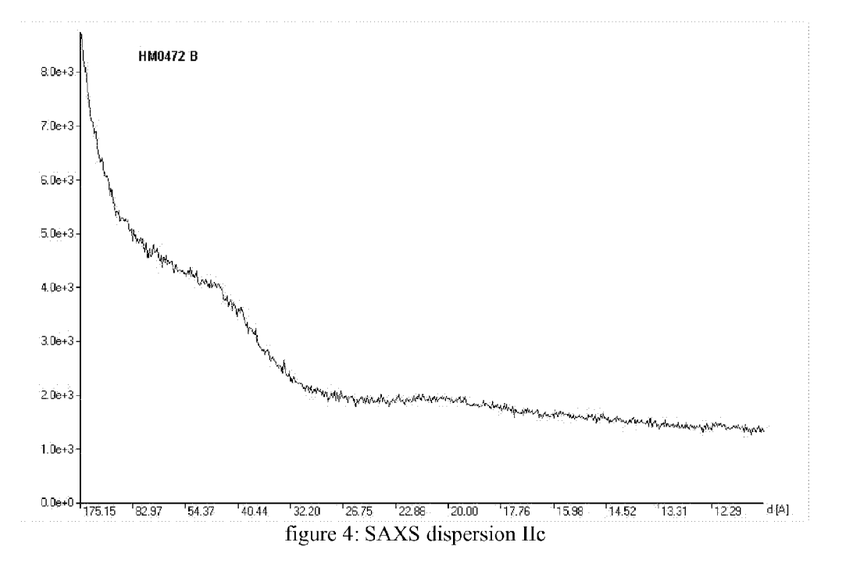
Figure 5:
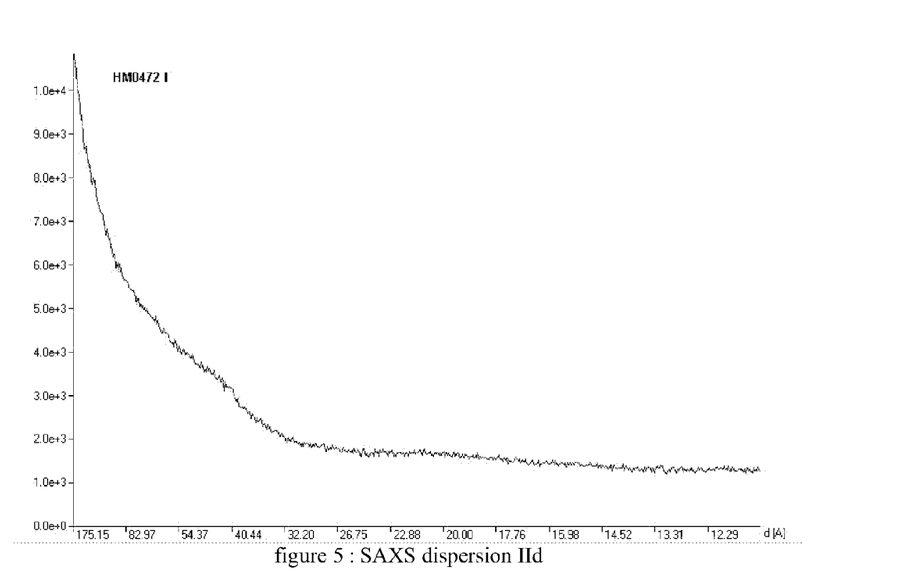
Figure 6:
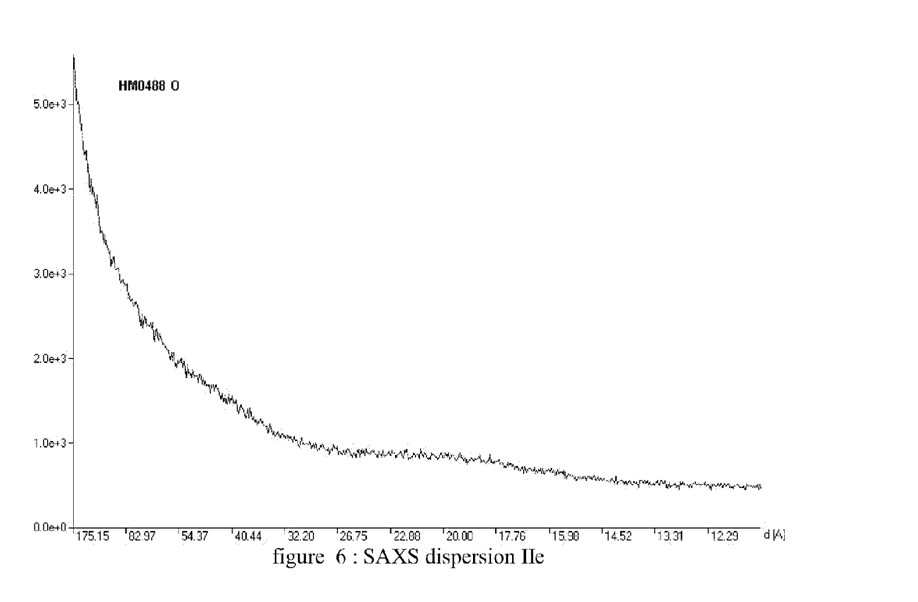

In the SAXS-curve, only a minor peak around 45 Å is present in the pattern of dispersion I. Also for dispersion IId, the peak at around 45 Å is decreased, and no peak around 18 Å is noticed. All other dispersions show a diffraction peak at 43 Å, indicating intercalation of the clay and/or a peak at 18 Å to 20 Å, being typical for non-intercallated clay platelets.

EXAMPLE 2

Cloisite 30B Nanodispersions in Suprasec 2185

The same set of experiments was conducted using a polymeric MDI, Suprasec 2185 (=S2185).

The isocyanate is Suprasec 2185, is a polymeric MDI with a NCO value around 30.6% and a viscosity at 25 deg C of 3-4 poise.

A dispersion III according to the present invention was provided by adding Cloisite 30B (=C30B) gradually to Suprasec 2185 at 50 deg C and under low shear mixing. When all the clay particles have been added, the dispersion is mixed at maximum shear (+1000 rpm) at 50 deg C for 1 hour. The temperature of the dispersion is then increased to 80 deg C and Arcol 1374 (=A1374) is added gradually. The dispersion is further mixed at high shear (3000-5000 rpm) and 80 deg C for 2 hours. The ratio of the components are 5 pbw Cloisite 30B/85 pbw Suprasec 2185/10 pbw Arcol. The properties of this dispersion are represented in table 2 by dispersion III.

The same set of experiments was conducted using a polymeric MDI, Suprasec 2185 (=S2185).

Dispersion IVa) is provided using same mixing temperatures and mixing times as in the procedure described above for dispersion III, but without the addition of Arcol 1374;

For dispersion IVb), 6 hours mixing at 50 deg C and maximum shear without the addition of Arcol 1374 was used;

For dispersion IVc), 6 hours mixing at 80 deg C and maximum shear without the addition of Arcol 1374 was used;

For dispersion IVd), prepolymerisation of Suprasec 2185 and Arcol 1374 at 80 deg C for 30 min before 5 wt % clay Cloisite 30B is added, followed by 2 hours mixing at 80 deg C and high shear.

For dispersion IVe), Arcol 1374 was replaced by PPG4000 (100% PO polyol) in the dispersion procedure described above (C30B-S2185 dispersion mixed at 50 deg C for 1 hour, 10 w % PPG4000 is added, dispersion is further mixed at 80 deg C for 2 hours)

The same observations were made as compared to example 1, as evidenced by the data in table 2 and FIGS. 7 to 12.

TABLE 2

| Dispersion | Viscosity | SAXS |
|---|---|---|
| III | 329 cPs | Most of the clay is exfoliated. Still a small peak present at 19 Å. (see FIG. 7) |
| IVa | 108 cPs | Some intercalation Peak at 19 Å (see FIG. 8) |
| IVb | 97 cPs | No intercalation Peak at 18.5 Å (see FIG. 9) |
| IVc | 212 cPs | Intercalation Peak at 19 and 45 Å (see FIG. 10) |
| IVd | 239 cPs | Intercalation Peak at 44 Å; small peak at 19 Å (see FIG. 11) |
| IVe | 189 cPs | Minor intercalation Peak at 18 Å (see FIG. 12) |

Figure 7:
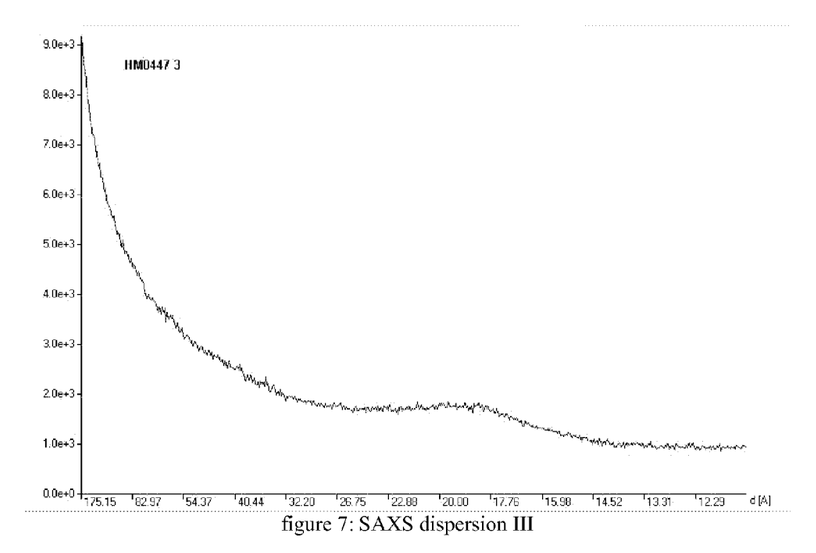
Figure 8:
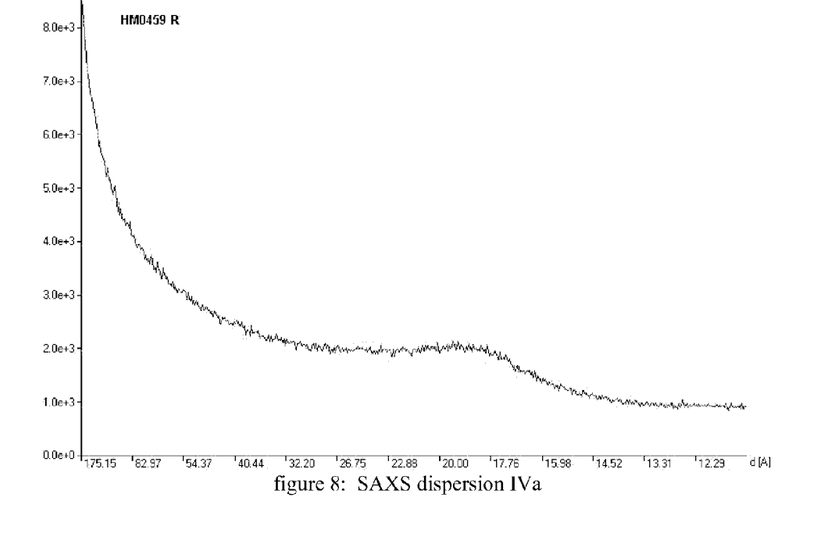
Figure 9:
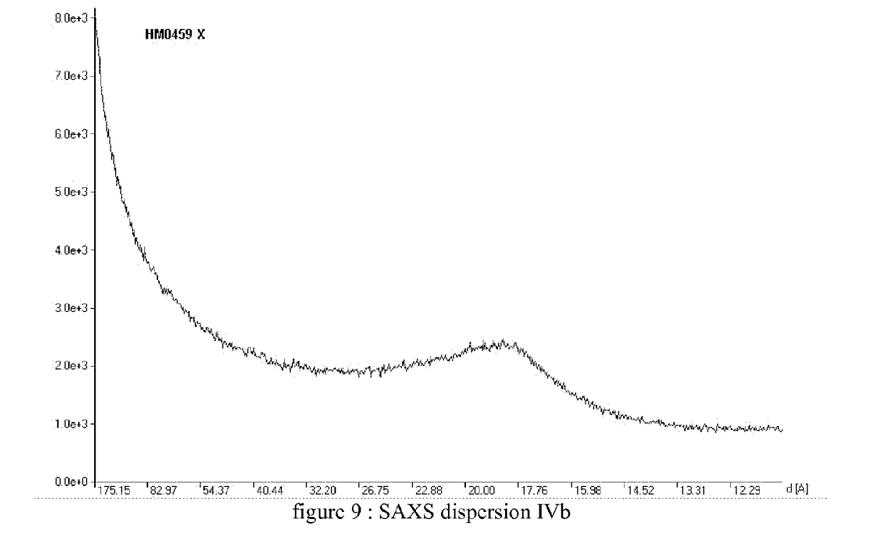
Figure 10:
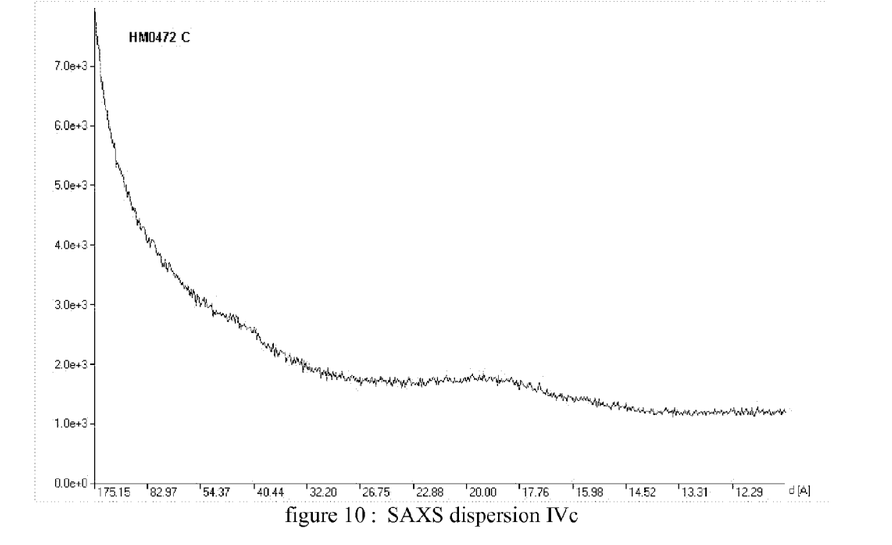
Figure 11:
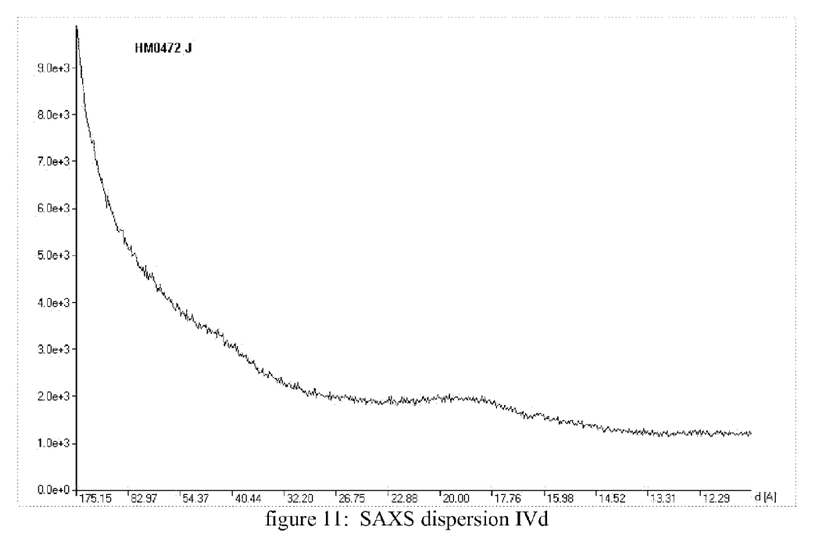
Figure 12:
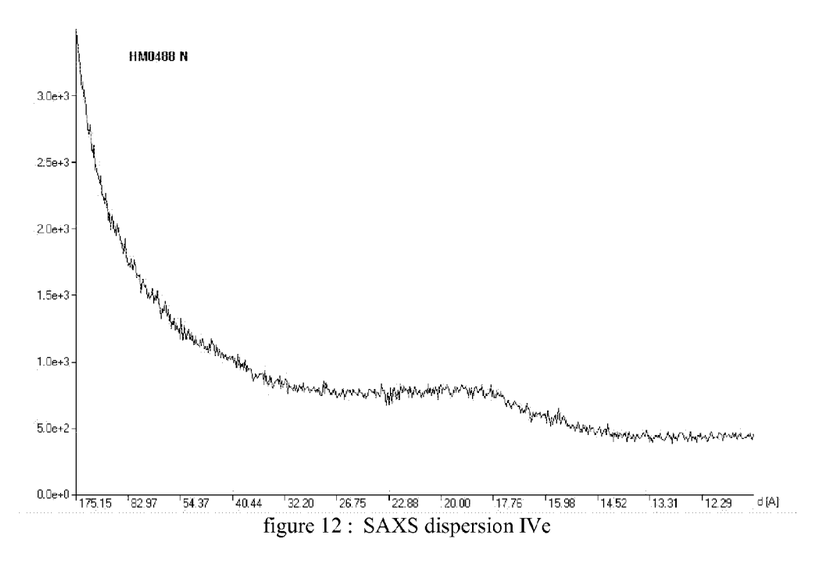

In the SAXS-curve, a minor diffraction peak is present at 19 Å in the pattern of dispersion III. Also for dispersion IVd, the peak at around 20 Å is decreased. All other dispersions show a diffraction peak at 45 to 43 Å, indicating intercalation of the clay and/or a peak at 18 Å to 20 Å, being typical for non-intercallated clay platelets.

As is clear from the comparison of dispersions I and III according to the invention, and dispersions IIa, respectively IVa, the addition of the EO-tipped polyol causes both intercalation of the clay platelets, providing clay nanoparticles in the dispersion, and causes the viscosity to raise significantly, providing a stable dispersion.

EXAMPLE 3

Cloisite 30B Nanodispersions in Suprasec 3050

Figure 13:
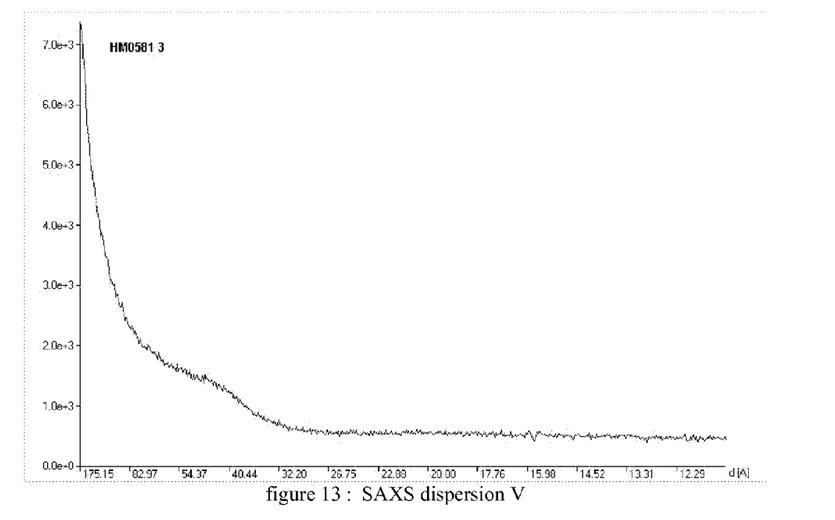

An alternative EO-tipped polyol was used to disperse Cloisite 30B in suprasec 3050. The dispersion is referred to as dispersion V (see FIG. 13)

An EO-polyol was used, more in particular a tri-functional EO-polyol with a hydroxyl value of 683 mgKOH/g and low potassium content. The following dispersion composition was applied:

- 5 wt % Cloisite 30B (dried for Shin an oven at 80° C to 1.35 wt % $H_2O$)
- 1.20 wt % EO-polyol (dried for several hours under vacuum at 80° C)
- 93.80 wt % Suprasec 3050

The dispersions were prepared under the conditions as used for dispersion I and III.

The dispersion obtained, is homogeneous and stable at preparation and also after storage at room temperature after one week. No precipitation is formed.

The viscosity of the dispersion was 1358 cP after mixing, and increased to 2139 cP after one week storage.

Small Angle X-ray Scattering (see FIG. 13) indicates intercalation. The SAXS pattern shows a peak at ~45 Å.

EXAMPLE 4

Cloisite 30B Nanodispersions in Suprasec 3050

The type and percentage of the EO-tipped polyol that was added to a 5 wt % dispersion of Cloisite 30B in S3050 was varied. Dispersions with 10 wt % and 20 wt % (wt % on total dispersion) of EO-tipped polyol were prepared.

The procedure for making the dispersions (in table 3 referred to as dispersions VIa to VIf) was as follows:
- 5 pbw of Cloisite 30B was dispersed in either 85 pbw or 75 pbw of S3050 via high shear mixing with a Cowles blade at 50 deg C for 1 h
- either 10 pbw or 20 pbw of a EO-tipped polyol was added
- the dispersion was further mixed for 2 h at 80 deg C Following EO-tipped polyols were used:
a) Arcol 1374: a glycerol initiated EO end-tipped polypropylene oxide polyol with 15% EO, a functionality of 2.4, OHv 28, and a mole weight of 6000.
b) Acclaim 4220: a 2-functional EO end-tipped polypropylene oxide polyol with 15% EO, OHv 28, and a mole weight of 4000.
c) Acclaim 2220: a 2-functional EO end-tipped polypropylene oxide polyol with 15% EO, OHv 50, and a mole weight of 2240.

The comparative dispersion VIIa was provided by means of the same procedure, but 20 wt % PPG 4000, being a 2-functional polypropylene oxide polyol with OHv 28, and a mole weight of 4000 was used.

The comparative dispersion VIIb was provided by means of the same procedure, but between the two mixing stages, no polyol was added.

The EO-tipped polyols were dried under reduced pressure at 105 deg C.

The dispersions were evaluated via Small Angle X-Ray Scattering and Viscometry. The stability of the dispersions were evaluated visually after 2 months of retention of the dispersion at ambient temperature.

The results are given in table 3.

TABLE 3

Figure 14A:
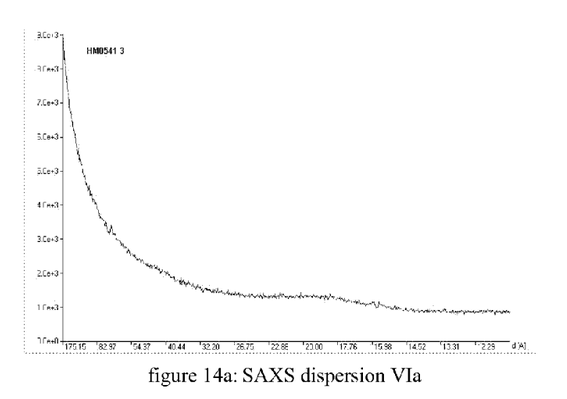
FIGS. 14 to 19 are SAXS diagram of dispersions according to the present invention, accompanied by a picture of the dispersion after 2 month storage.
Figure 14B:
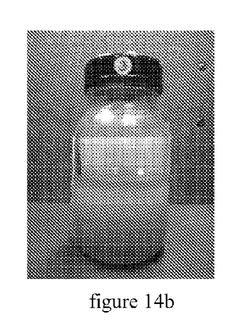
Figure 15A:
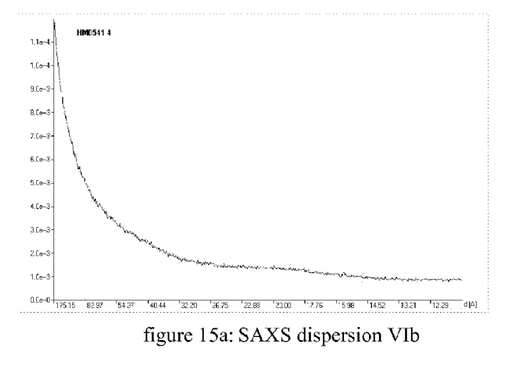
Figure 15B:
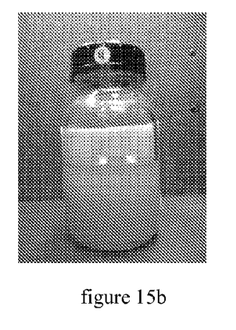
Figure 16A:
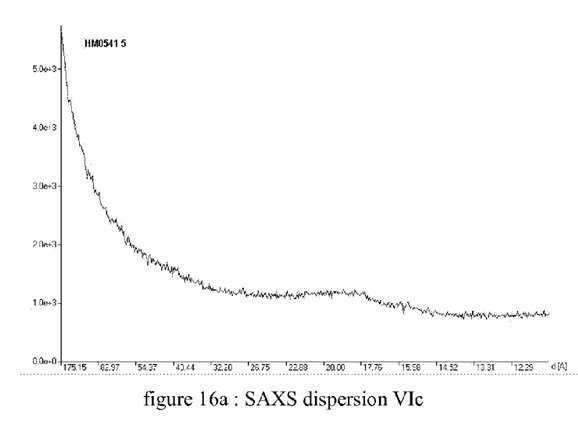
Figure 16B:
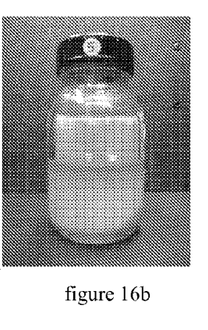
Figure 17A:
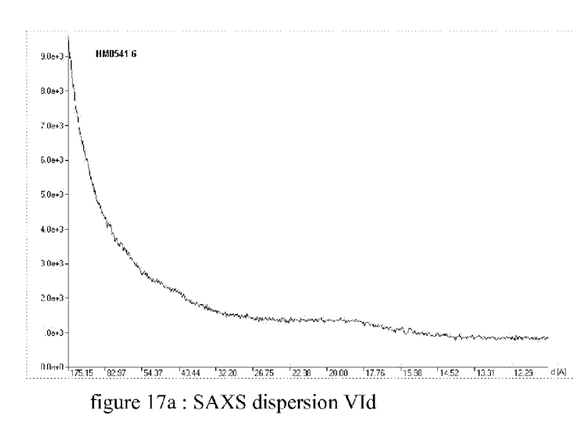
Figure 17B:
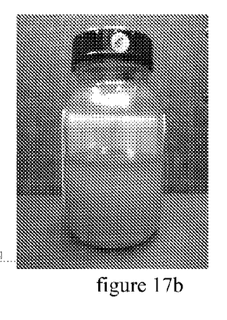
Figure 18A:
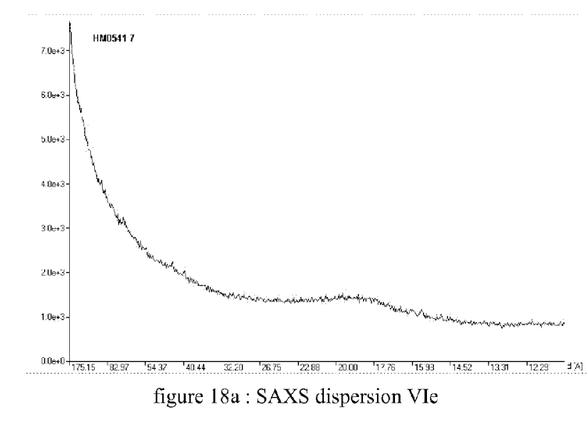
Figure 18B:
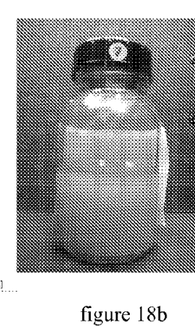
Figure 19A:
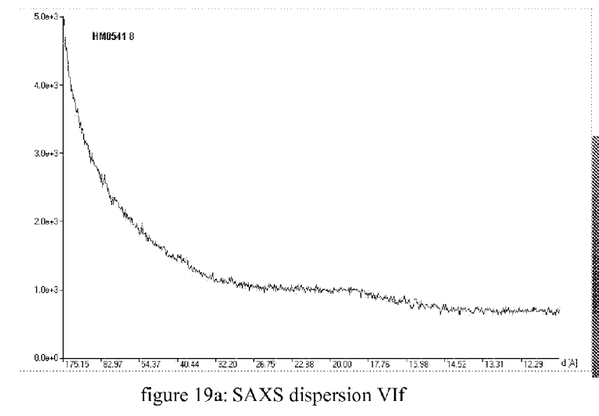
Figure 19B:
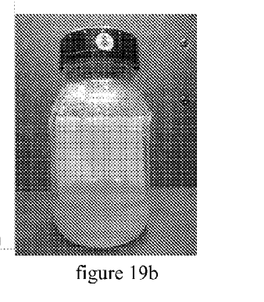
Figure 20A:
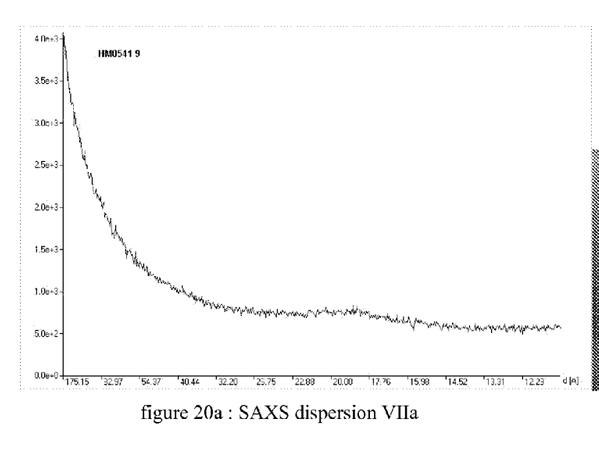
FIGS. 20 and 21 are SAXS diagram of comparative dispersions, accompanied by a picture of the dispersion after 2 month storage.
Figure 20B:
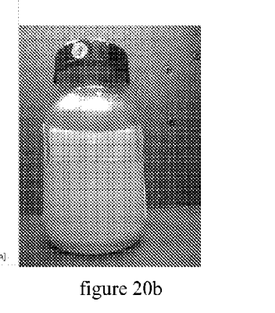
Figure 21A:
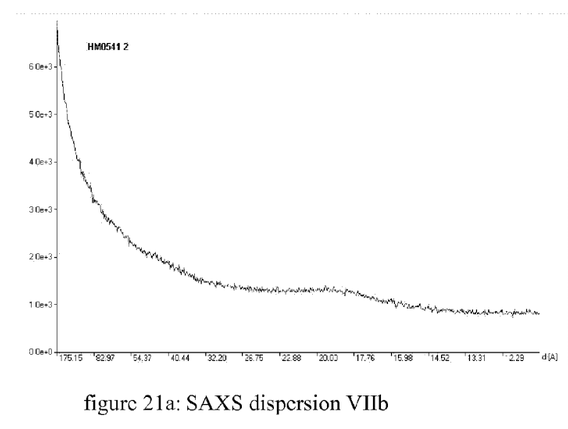
Figure 21B:
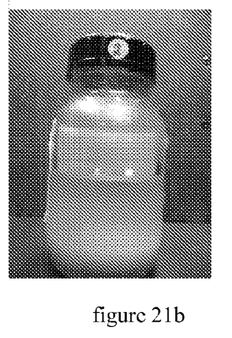

|  | Dispersion | Viscosity | SAXS | Stability of the dispersion after 2 months |
|---|---|---|---|---|
| According to the invention | VIa: 5 pbw Cloisite 30B + 85 pbw S3050 + 10 pbw Arcol 1374 | 189 cPs | A very small peak at 18.5 Å (see FIG. 14a) | Stable dispersion (see FIG. 14b) |
|  | VIb: 5 pbw Cloisite 30B + 75 pbw S3050 + 20 pbw Arcol 1374 | 981 cPs | No scattering peak. Complete exfoliation of clay (see FIG. 15a) | Stable dispersion (see FIG. 15b) |
|  | VIc: 5 pbw Cloisite 30B + 85 pbw S3050 + 10 pbw Acclaim 4220 | 82 cPs | A small peak at 18.25 Å (see FIG. 16a) | Some minor precipitation of the nanoclay (see FIG. 16b) |
|  | VId: 5 pbw Cloisite 30B + 75 pbw S3050 + 20 pbw Acclaim 4220 | 634 cPs | A small peak at 18.25 Å + a small intercalation peak at 43 Å (see FIG. 17a) | Stable dispersion (see FIG. 17b) |
|  | VIe: 5 pbw Cloisite 30B + 85 pbw S3050 + 10 pbw Acclaim 2220 | 146 cPs | A small peak at 18.25 Å (see FIG. 18a) | Stable dispersion (see FIG. 18b) |
|  | VIf: 5 pbw Cloisite 30B + 75 pbw S3050 + 20 pbw Acclaim 2220 | 926 cPs | A very small peak at 18.3 Å (see FIG. 19a) | Stable dispersion (see FIG. 19b) |
| comparative | VIIa: 5 pbw Cloisite 30B + 75 pbw S3050 + 20 pbw PPG 4000 | 198 cPs | A very small peak at 18.4 Å (see FIG. 20a) | Some precipitation of the nanoclay (see FIG. 20b) |
|  | VIIb: 95 pbw S3050 + 5 pbw C30B | <30 cPs | Peak at 18.5 Å + a very small peak at 45 Å (see FIG. 21a) | Precipitation of the nanoclay (see FIG. 21b) |

The viscosity of all the dispersions VIa to VIf were higher than the viscosity prepared without an EO-tipped polyol (dispersion VIIb). The viscosity of the dispersions with 20 wt % of an EO end-tipped polyol was significantly higher than the viscosities of the dispersions with only 10 wt % of the same EO end-tipped polyol. The viscosity of the dispersion with 20 wt % of the PO polyol PPG4000 (dispersion VIIa) was relatively low. The dispersions comprising EO-end tipped polyol were found to be stable, or showed only a minor tendency to precipitate, whereas the dispersion with a PO polyol showed more precipitation. In case no polyol was added, the dispersion was unstable and showed significant precipitation.

It is to be understood that although preferred embodiments and/or materials have been discussed for providing embodiments according to the present invention, various modifications or changes may be made without departing from the scope and spirit of this invention.

The invention claimed is:

1. A method for providing a liquid isocyanate composition, said method comprises
   providing
      at least one isocyanate component;
      clay particles;
      at least one E0-tipped polyol;
   combining said isocyanate component and said clay particles;
   mixing said combination of isocyanate component and clay particles, for a period of 1 minute to 10 hours, at high shear, while maintaining the temperature of said combination in the range of 25 deg C to 80 deg C;
   adding said E0-tipped polyol to said combination of isocyanate component and clay particles in such amount that the NCO/OH ratio being in the range of 1500 to 1.5;
   mixing said combination of isocyanate component, clay particles and EO-tipped polyol, for a period of 1 minute to 10 hours, at high shear, while maintaining the temperature of said combination in the range of 60 deg C to 100 deg C, thereby providing said liquid isocyanate composition.

2. A method according to claim 1, wherein the mixing of said combination of isocyanate component, clay particles and E0-tipped polyol is done by mixing at a speed in the range of 500 to 3000 rpm.

3. A method according to claim 1, wherein the mixing of said combination of isocyanate component and clay particles is done by mixing at a speed in the range of 1500 to 5000 rpm.

4. The method according to claim 1, wherein said EO-tipped polyol is an EO-tipped PO-polyol.

5. The method according to claim 1, wherein said EO-tipped polyol is an EO-polyol.

6. The method according to claim 1, wherein said EO-tipped polyol provides 5% w to 25% w of the liquid isocyanate composition.

7. The method according to claim 1, wherein said EO-tipped polyol provides 10 w % to 20 w % of the liquid isocyanate composition.

8. The method according to claim 1, wherein the NCO/OH ratio is between 300 and 1.8.

9. The method according to claim 1, wherein the clay is an organically modified clay.

10. The method according to claim 1, wherein the at least one isocyanate component is MDI.

* * * * *